United States Patent [19]

Reiff et al.

[11] 4,108,814

[45] Aug. 22, 1978

[54] AQUEOUS POLYURETHANE DISPERSIONS FROM SOLVENT-FREE PREPOLYMERS USING SULFONATE DIOLS

[75] Inventors: Helmut Reiff, New Martinsville, W. Va.; Wolfgang Wenzel, Leverkusen; Jürgen Grammel, Cologne; Dieter Dieterich, Leverkusen, all of Fed. Rep. of Germany

[73] Assignee: Bayer Aktiengesellschaft, Leverkusen, Fed. Rep. of Germany

[21] Appl. No.: 777,206

[22] Filed: Mar. 14, 1977

Related U.S. Application Data

[63] Continuation of Ser. No. 614,730, Sep. 18, 1975, abandoned.

[30] Foreign Application Priority Data

Sep. 28, 1974 [DE] Fed. Rep. of Germany ....... 2446440

[51] Int. Cl.$^2$ .................... C08G 18/12; C08G 18/38; C08G 18/84
[52] U.S. Cl. ................. 260/29.2 TN; 260/29.4 R; 260/849; 528/71
[58] Field of Search .............................. 260/29.2 TN

[56] References Cited

U.S. PATENT DOCUMENTS

| | | |
|---|---|---|
| 3,397,989 | 8/1968 | Keberle et al. ............. 260/29.2 TN |
| 3,401,151 | 9/1968 | Wieden et al. ............. 260/29.2 TN |
| 3,438,940 | 4/1969 | Keberle et al. ............. 260/29.2 TN |
| 3,461,103 | 8/1969 | Keberle et al. ............. 260/29.2 TN |
| 3,479,310 | 11/1969 | Dieterich et al. ............ 260/29.2 TN |
| 3,756,992 | 9/1973 | Dieterich et al. ............ 260/29.2 TN |
| 3,796,678 | 3/1974 | Bartizal ..................... 260/29.2 TN |
| 3,879,450 | 4/1975 | Velker et al. ............... 260/29.2 TN |

*Primary Examiner*—Murray Tillman
*Assistant Examiner*—Arthur H. Koeckert

*Attorney, Agent, or Firm*—Gene Harsh; Lawrence S. Pope; Frederick H. Colen

[57] ABSTRACT

This invention relates to a process for the production of water dispersible polyurethanes by reacting polyisocyanates with sulphonate group containing diols. The sulphonate diols have the general formula:

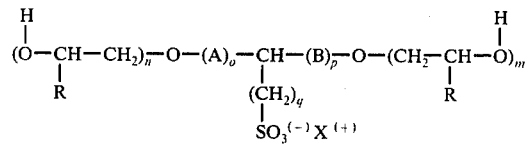

wherein

A and B, which may be the same or different, each represents a divalent aliphatic hydrocarbon group containing from 1 to 6 carbon atoms, R represents hydrogen, an aliphatic hydrocarbon group containing 1 to 4 carbon atoms or a phenyl group, $X^{(+)}$ represents an alkali metal cation or ammonium group which may be substituted n and m, which may be the same or different, each represents an integer between 0 and 30 inclusive, o and p, represent 0 or 1, and q represents an integer of 0 or 2.

Sufficient amounts of this diol are used to provide the final polymer with a sulphonate group content of about 0.1 to 6 wt.%. In a preferred embodiment, a prepolymer is formed in substance with the sulphonate bearing diol, the polyisocyanate and optionally other reactive hydrogen bearing compounds. The prepolymer is then chain extended with water and water soluble polyamines. This second stage may take place in water and the polyamines may carry sulphonate groups.

9 Claims, No Drawings

AQUEOUS POLYURETHANE DISPERSIONS FROM SOLVENT-FREE PREPOLYMERS USING SULFONATE DIOLS

This is a continuation of application Ser. No. 614,730, filed Sept. 18, 1975, now abandoned.

BACKGROUND OF THE INVENTION

Processes for the preparation of stable, aqueous polyurethane polyurea dispersions are known (e.g. DBP No. 1,184,946 which is equivalent to U.S. Pat. No. 3,388,087; DAS No. 1,237,306 which is equivalent to U.S. Pat. No. 3,461,103; DOS No. 1,495,745 which is equivalent to U.S. Pat. No. 3,479,310 and German DOS 1,770,068 which is equivalent to U.S. Pat. No. 3,756,992 as well as German DOS 2,019,324 which is equivalent to U.S. Pat. No. 3,686,108 and German Pat. No. 1,178,586 which is equivalent to British Pat. No. 1,043,260 and also DOS No. 1,595,602; see also D. Dieterich et al, Angew. Chem. 82, 53 (1970)). The dispersions already described are based on the principle of incorporating hydrophilic centers into a macromolecular chain of a polyurethane polyurea molecule. In the known dispersions, these hydrophilic centers or so-called "internal emulsifiers" are ionic groups or ether functions. The ionic groups are either incorporated in the prepolymer in the form of certain diols or used as modified amines for chain lengthening the prepolymers, each of which has at least two NCO end-groups.

High quality polyurethane films which are suitable, e.g. for coating textiles, have hitherto been obtained from dispersions produced by processes in which organic solvents were used in the polyaddition reaction. By this method it is possible to operate in homogeneous solutions for obtaining products up to relatively high molecular weights and thus achieve problem-free dispersion. In particular, high quality, finely-divided and stable dispersions may be obtained in this way even with a low ionic group content.

This highly developed process which includes both anionic, cationic and non-ionic emulsifier segments has the disadvantage of requiring extensive operations for distilling off and rectifying the organic solvent. This is connected with a poor volume/time yield in the production process. The organic solvent used as reaction medium increases the risk of explosion and fire during the process. If attempts are made to produce such products without organic solvents one obtains, at best, relatively coarse dispersions the film forming capacity and mechanical properties of which are inadequate for numerous purposes.

A process for solvent-free preparation of polyurethane dispersions is also known, the so-called "melt dispersion process" (DOS No. 1,770,068 which is equivalent to U.S. Pat. No. 3,756,992, D. Dieterich and H. Reiff, Angew. makromol. Chem. 76, 85 (1972)). In this process, an oligourethane which has been modified with ionic groups and contains acylated amino end-groups is reacted with formaldehyde to convert it into the corresponding oligourethane which contains methylol end-groups attached to acylated amino groups and this oligourethane is then chain lengthened by a heat treatment which gives rise to condensation of the reactive methylol end-groups. This chain lengthening reaction may be carried out in the presence of water so that an aqueous dispersion of polyurethane is obtained directly. This process is particularly suitable for producing cationically modified polyurethanes or anionic polyurethanes which contain carboxylate groups. The necessary combination of the isocyanate polyaddition reaction with the above-mentioned chain lengthening reaction by means of polycondensable methylol groups which are attached to acylamino end-groups is somewhat more complicated than the known isocyanate polyaddition carried out by the prepolymer process in which prepolymers which contain isocyanate groups are reacted with conventional chain lengthening agents, such as water or diamines. This extra expenditure could be justified in the process according to DOS No. 1,770,068 on the grounds that this process made it possible for the first time to produce polyurethane dispersions without the aid of special stirrers and without emulsifiers or solvents.

The problem of producing aqueous dispersions of polyurethanes which contain sulphonate groups and are therefore substantially unaffected by electrolytes by a simple process which does not make use of the above aids and is confined to the methods of the isocyanate polyaddition reaction remained unsolved. Qualitatively high grade dispersions of polyurethanes which contain sulphonate groups have hitherto been obtained from prepolymers which contain NCO end-groups by chain lengthening solutions of these prepolymers in organic solvents with diaminosulphonate solutions. Attempts to carry out this process without solvents have hitherto failed; it was impossible to obtain dispersions from which films with acceptable physical properties could be obtained.

It has now surprisingly been found that high quality dispersions of sulphonate group-containing polyurethanes which are substantially free from the influence of electrolytes may be obtained by a simple isocyanate polyaddition reaction without the aid of stirrers with high shearing forces and without the aid of emulsifiers or solvents if quite specific sulphonate group containing diols which will be described below are used in the production of the polyurethanes.

SUMMARY OF THE INVENTION

This invention therefore relates to a process for the preparation of polyurethanes which contain sulphonate groups by reacting polyisocyanates with diols which contain sulphonate groups and optionally in addition other compounds which contain hydrogen atoms that are reactive with isocyanate groups and which are at least difunctional in the isocyanate polyaddition reaction, characterized in that the diols containing sulphonate groups have a melting or softening point below 120° C and correspond to the following general formula:

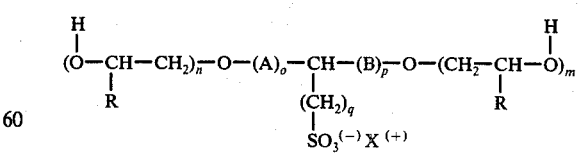

are used in such quantities that the polyurethane contains from 0.1 to 6% by weight, of $SO_3^{(-)}$ groups. In the above formula, A and B which may be the same or different, each represents a divalent aliphatic hydrocarbon group containing from 1 to 6 carbon atoms;

R represents hydrogen, an aliphatic hydrocarbon group containing from 1 to 4 carbon atoms or a phenyl group, $X^{(+)}$ represents an alkali metal cation or an ammonium group which may be substituted;

n and m which may be the same or different, and represents an integer of from 0 to 30, o and p represent 0 or 1; and q represents an integer of from 0 to 2.

DETAILED DESCRIPTION OF THE INVENTION

The diols with sulphonate groups used in the process according to the invention are preferably the following:

1. those of Formula (I):

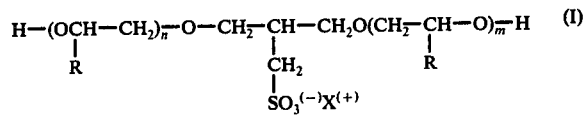

wherein
R represents hydrogen or a methyl group;
n and m which may be the same or different, each represents an integer of from 0 to 3; and
$X^{(+)}$ is as defined above;

2. those of Formula (II):

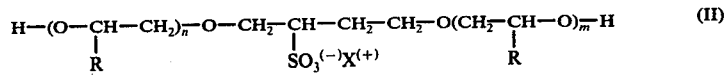

wherein
R represents hydrogen or a methyl group;
n and m which may be the same or different, each represents an integer of from 0 to 3; and
$X^{(+)}$ is as defined above; and 3. those of Formula (III):

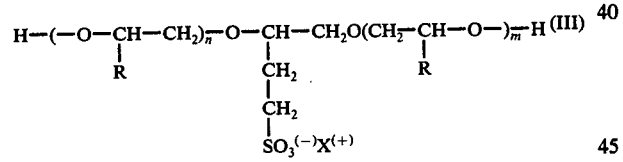

wherein
R represents hydrogen or a methyl group;
n and m which may be the same or different, each represents an integer of from 0 to 3; and
$X^{(+)}$ is as defined above.

It is particularly preferred to use those diols with sulphonate groups for the process according to the invention which have a melting or softening point below 120° C. This condition is fulfilled in the case where n = m = 0 (compounds (I), (II) and (III) in particular if $X^{(+)}$ is a lithium cation or a $NH_4^{(+)}$ ion. If sodium or potassium salts of the diols with sulphonate groups are to be used, it is particularly advisable to use compounds of the formulae (I), (II) and (III) wherein n and m (in the statistical average) represent from 0.8 to 2. Those representatives of the last-mentioned compounds wherein R represents a methyl group are quite particularly preferred.

The preparation of compounds (I) is carried out quite simply by reacting the optionally alkoxylated 2-methylenepropane-1,3-diol with a bisulphite X $HSO_3$ in an aqueous medium. The unsaturated diol is dissolved in water and reacted with an aqueous solution of the bisulphite which has previously been adjusted to pH 7.1 with dilute X OH solution. The reaction mixture is stirred at room temperature and at the same time the pH is maintained at from 7.0 to 7.1 by the addition of dilute sulphuric acid. The reaction is completed when the pH remains constant. The reaction mixture is acidified to a pH of from 2 to 3 and excess $SO_2$ is driven off by stirring. The mixture is then neutralized with dilute X OH solution and evaporated to dryness. The sulphonate-containing diol is then extracted with methanol. Bisulphites X $HSO_3$ and alkaline solutions X OH wherein X represents potassium, sodium, lithium, or ammonium are preferably used for this process. Conversion of the resulting sulphonate diols into those wherein X represents some other component, for example a substituted ammonium group, may easily be achieved by replacing the cation $X^{(+)}$ by a hydrogen ion by means of an ion exchanger and then neutralizing the resulting free acid with the desired base. The cation $X^{(+)}$ in the sulphonate diols used in the process according to the invention may be not only alkali metal cations, but any ammonium cations of the formuls:

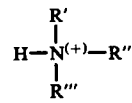

wherein
R', R" and R'" which may be the same or different, each preferably represents hydrogen or an alkyl group with from 1 to 4 carbon atoms, R' and R" when taken together with the central nitrogen atom may form a heterocyclic ring, for example a morpholine or hexahydropyridine ring.

Compounds (II) may be prepared in analogous manner by the chemical addition of bisulphite to optionally alkoxylated 2-butene-1,4-diol.

The preparation of compounds (III) may be carried out in analogous manner by chemical addition of bisulphite to optionally alkoxylated 1-butene-3,4-diol.

The bisulphite addition to such unsaturated diols has been described in Belgian Patent Specification No. 827,774.

Whether sulphonate diols which contain ether groups or those which are free from ether groups are used for the process according to the invention depends primarily on the melting or softening point of the diols which, as mentioned above, should preferably be below 120° C. The melting point of the sulphonated diols falls with increasing degree of alkoxylation. Compounds of formula (III) generally have a honey-like consistency even when free from ether groups, regardless of the nature of the cation $X^{(+)}$. It is therefore not necessary, although possible, to use diols with ether groups instead of the corresponding compounds (III) which are free from ether groups. The compatibility of the sulphonate diols which are an essential constituent of the invention with the other compounds optionally used in the process according to the invention, which are at least difunctional in the isocyanate polyaddition reaction and contain hydrogen atoms capable of reacting with isocyanate groups, increases with increasing degree of alkoxylation.

Any organic polyisocyanates may be used in the process according to the invention. It is preferred to use isocyanates of the formula $Q(NCO)_2$ wherein Q represents an aliphatic hydrocarbon group containing from 4 to 12 carbon atoms, a cycloaliphatic hydrocarbon group containing from 6 to 15 carbon atoms, an aromatic hydrocarbon group containing from 6 to 15 carbon atoms or an araliphatic hydrocarbon group containing from 7 to 15 carbon atoms. The following are examples of such preferred diisocyanates: tetramethylene-diisocyanate, hexamethylene diisocyanate, dodecamethylene-diisocyanate, 1,4-diisocyanato-cyclohexane, 1-isocyanato-3,3,5-trimethyl-5-isocyanatomethyl cyclohexane, 4,4'-diisocyanatodicyclohexylmethane, 4,4'-diisocyanato-dicyclohexyl-propane-(2,2); 1,4-diisocyanato-benzene, 2,4-diisocyanatotoluene, 2,6-diisocyanatotoluene, 4,4'-diisocyanatodiphenylmethane, 4,4'-diisocyanatodiphenyl-propane-(2,2), p-xylene-diisocyanate, $\alpha,\alpha,\alpha',\alpha'$-tetramethyl-m- or p-xylylene-diisocyanate and mixtures of these compounds.

The higher functional polyisocyanates known in polyurethane chemistry, as well as the modified polyisocyanates which are also known, such as polyisocyanates with carbodimide groups, allophanate groups, isocyanurate groups, urethane groups and/or biuret groups may, of course, also be used as part of all of the polyisocyanate component. The average molecular weight range of these polyisocyanates is from about 140 to about 1000.

The compounds optionally used in the process according to the invention, which are at least difunctional in the isocyanate polyaddition reaction and which contain hydrogen atoms which are reactive with isocyanate groups include, in particular, organic compounds within a molecular weight range of from about 62 to 10,000, preferably from about 1000 to 6,000, which contain a total of two amino groups, thio groups, carboxyl groups and/or hydroxyl groups. The dihydroxy compounds are preferred. Compounds which have a functionality of 3 or more in the isocyanate polyaddition reaction may also be added in small quantities to achieve a certain degree of branching and, as mentioned above, trifunctional or higher functional polyisocyanates may be used for the same purpose.

The hydroxyl compounds preferably used are the hydroxy polyesters, hydroxypolyethers, hydroxypolythioethers, hydroxypolyacetals, hydroxypolycarbonates and/or hydroxypolyester amides known in polyurethane chemistry. Suitable polyesters with hydroxyl groups include, e.g. reaction products of polyhydric, preferably dihydric alcohols with the optional inclusion of trihydric alcohols, with polybasic, preferably dibasic, carboxylic acids. Instead of free polycarboxylic acids, the corresponding polycarboxylic acid anhydrides or esters of lower alcohols or mixtures thereof may be used for producing the polyesters. The polycarboxylic acids may be aliphatic, cycloaliphatic, aromatic and/or heterocyclic and may be substituted, e.g. with halogen atoms, and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethylterephthalate and bis-glycol terephthalate. Suitable polyhydric alcohols include, e.g. ethylene glycol, propylene-1,2-and -1,3-glycol, butylene-1,4- and -2,3-glycol, hexane-1,6-diol, octane-1,8-diol, neopentylglycol-cyclohexanedimethanol (1,4-bis-hydroxymethylcyclohexane), 2-methyl-propane-1,3-diol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethyleneglycol, tetraethyleneglycol, polyethyleneglycols, dipropylene glycol, polypropyleneglycols, dibutyleneglycol and polybutylene glycols. The polyesters may contain a proportion of carboxyl end-groups. Polyesters of lactones, such as $\epsilon$-caprolactone, or hydroxycarboxylic acids, such as $\omega$-hydroxy-caproic acid, may also be used.

The polyethers with preferably 2 hydroxyl groups which may also be used according to the invention are known and may be obtained, e.g. by the polymerization of epoxides, such as ethylene oxide, propylene oxide, butylene oxide, tetrahydrofuran, styrene oxide or epichlorohydrin, either each on its own, e.g. in the presence of $BF_3$, or by an addition of these epoxides, optionally as mixtures or successively, to starting components which contain reactive hydrogen atoms, such as alcohols or amines, e.g. water, ethylene glycol, propylene-1,3- or 1,2-glycol, 4,4'-dihydroxy-diphenylpropane or aniline.

Polyethers which are modified with vinyl polymers, e.g. the polyethers which may be obtained by polymerizing styrene or acrylonitrile in the presence of polyethers (U.S. Pat. Nos. 3,383,351; 3,304,273; 3,523,093 and 3,110,695 and German Pat. No. 1,152,536) are also suitable. The higher functional polyethers of which a certan proportion may be included are obtained in analogous manner by known methods of alkoxylation of higher functional starter molecules, e.g. ammonia, ethanolamine, ethylenediamine or sucrose.

Suitable polythioethers include, in particular, the condensation products obtained by condensing thiodiglycol either on its own and/or with other glycols, dicarboxylic acids, formaldehyde, aminocarboxylic acids or aminoalcohols. The products obtained are polythio mixed ethers, polythio ether esters or polythioether ester amides, depending on the co-components.

Suitable polyacetals include, e.g. the compounds which may be prepared from glycols, such as diethyleneglycol, triethyleneglycol, 4,4'-dioxethoxy-diphenyldimethylmethane and hexane diol with formaldehyde. Polyacetals suitable for the process according to the invention may also be prepared by polymerizing cyclic acetals.

Suitable hydroxyl polycarbonates are known and may be prepared, e.g. by reacting diols, such as propane-1,3-diol, butane-1,4-diol and/or hexane-1,6-diol, diethylene glycol, triethyleneglycol or tetraethyleneglycol, with diarylcarbonates, such as diphenylcarbonate or phosgene.

Suitable polyesteramides and polyamides include, e.g. the predominantly linear condensates obtained from polybasic saturated and unsaturated carboxylic acids or their anhydrides and polyvalent saturated and unsaturated amino alcohols, diamines, polyamines and mixtures thereof. Polyhydroxyl compounds which already contain urethane or urea groups may also be used. Examples are linear polyamides from adipic acid and 1,6-diamino-hexane, polyester amides from adipic acid, hexanediol-1.6 and ethylene diamine.

Simple glycols, such as ethylene glycol, propylene glycol, or hexamethylene glycol may, of course, also be used in the preparation of the NCO prepolymers, e.g. by the prepolymer method described below.

Representatives of these compounds which may be used according to the invention have been described, e.g. in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199, and in Kunststoff-Handbuch, Volume VII, Vieweg-Höchtlen, Carl-Hanser-Verlag, Munich, 1966, e.g. on pages 45 to 71.

The process according to the invention for preparing ionically modified polyurethanes, in particular with simultaneous conversion of these polyurethanes into an aqueous dispersion, is preferably carried out by first preparing a prepolymer with isocyanate end-groups from the sulphonate diols which are essential to the invention, the polyisocyanate components and the other compounds optionally used which are preferably difunctional and contain hydrogen atoms which are reactive with isocyanate groups. The reactants for producing these prepolymers are preferably used in such proportions that the ratio of isocyanate groups to the hydrogen atoms which are reactive with isocyanate groups, which hydrogen atoms are preferably in the form of hydroxyl groups, is from about 1.05 to 6, preferably from about 1.1 to 3.

The sequence in which the individual reactants are put into the process is unimportant. A mixture of the sulphonate diols and the optional polyhydroxyl compounds may be reacted with the polyisocyanate component or an NCO prepolymer may first be prepared from the sulphonate diol and polyisocyanate component, and this prepolymer may then be further modified with a subequivalent quantity of the optional polyol, which is preferably a diol. This process may also be reversed, i.e. an NCO prepolymer may first be prepared from a polyol or diol which is free from sulphonate groups and the polyisocyanate, and this prepolymer may then be converted into an ionically modified prepolymer.

Preparation of the NCO prepolymers is preferably carried out in substance at from about 30° to 190° C, preferably from about 50° to 120° C. Although the prepolymers may, of course, be prepared in the presence of organic solvents, it is regarded as one of the major advantages of the process according to the invention that same solvents may be dispensed with. Suitable solvents would be, for example, acetone, methyl ethyl ketone, ethyl acetate, dimethylformamide or cyclo-hexanone.

In a second stage of the process, the NCO prepolymer obtained is now converted into the product of the process according to the invention, the ionically modified polyurethane, by a known chain lengthening reaction. In the preferred embodiment of the process according to the invention, this chain lengthening reaction is combined with conversion of the product into an aqueous dispersion. The simplest method of achieving this consists of using only water as chain lengthening agent. This means that the prepolymer, which is either liquid or of a honey-like consistency, is stirred up with from about 0.2 to 10 times its weight of water. Simple laboratory stirrers are sufficient for this operation although dispersing machines with high shearing forces or non-mechanical dispersing means, such as ultra-sonic waves of extremely high frequency may, of course, be used if desired. The temperature employed for the mixing process is from about 1° to 180° C, preferably from about 20° to 100° C. This process may be carried out under pressure.

The chain lengthening reaction may also be carried out with mixtures of water and water-soluble chain lengthening agents, preferably those which are more highly reactive with isocyanate groups than is water. The NCO prepolymer may also be dispersed in water and the chain lengthening agent may be added when the prepolymer has been dispersed. Suitable chain lengthening agents for this purpose are, in particular, polyamines in which the amino groups are exclusively primary or secondary amino groups, preferably diamines with molecular weights above 31 and preferably from about 32 to 600. Examples of such polyamines which may be used as chain lengthening agents include: hydrazine, ethylene diamine, diethylene triamine, 1,2-diaminopropane, 1,3-diaminopropane, 3,3,5-trimethyl-5-aminomethyl-cyclohexylamine and 1,4-diaminobutane. Other suitable bifunctional chain lengthening agents have been described in German Offenlegungsschrift No. 1,495,847 and in German Auslegeschrift No. 1,237,306. In this embodiment of the process according to the invention, the quantity of water used is also from 0.2 to 10 times the weight of the NCO prepolymer.

In a praticularly preferred embodiment of the process according to the invention, the chain lengthening reaction is carried out using a mixture of water and polyamines of the type mentioned above which in addition are modified by chemically fixed ionic groups, preferably chemically fixed sulphonate groups. One such ionically modified chain lengthening agent, for example, is the sodium salt of ethylenediamino-2-ethanesulphonic acid.

The quantity of sulphonate diols which are essential to the invention and their degree of alkoxylation, as well as the quantity of the optional chain lengthening agent with sulphonate groups used for carrying out the process according to the invention are chosen so that the products of the process contain from about 0.1 to 6 and preferably from about 0.6 to 3% by weight of of $SO_3(-)$ groups, based on the solids content. The chain lengthening reaction in the second reaction stage may also be carried out in the presence of solvents in which the prepolymer is dissolved although it is one of the major advantages of the process according to the invention that it is possible, in principle, to dispense with such solvents. The solvents which may be used for the chain lengthening reactions are the same as those used for preparing the prepolymers.

The process according to the invention for preparing ionically modified polyrethanes may, of course, also be carried out by the method according to U.S. Pat. No. 3,756,992, in which a prepolymer which contains acylated amino end-groups is first prepared from the NCO prepolymer, for example, by reacting it with urea, and this prepolymer with acylated amino groups is then chain lengthened with formaldehyde by way of the intermediate stage of prepolymers which contain methylol end-groups.

Preparation of the aqueous dispersions of the products of the process may, of course, also be carried out with the aid of external emulsifiers although it is one of the major advantages of the process accordng to the invention that the use of such emulsifiers may be omitted. Suitable emulsifiers are e.g. salts of long chain fatty acids, salts of alkyl aryl sulfonic acids, oxethylated alkyl phenols, block copolymers of ethylene oxide and propylene oxide.

The process according to the ivention may, of course, also be carried out in the presence of conventional catalysts which accelerate the NCO/OH reaction. A number of such catalysts are discussed in "Polyurethanes, Chemistry and Technology", supra. and include lead benzoate, stannic chloride, ferric chloride and triethylene diamine.

The process according to the invention enables high quality polyurethane-(polyurea) dispersions to be produced by a simple method using exclusively the principles of the isocyanate polyaddition reaction. Since the products of the process contain sulphonate groups as ionic centers, their aqueous dispersions differ from dispersions of cationic or anionic polyurethanes which contain exclusively carboxylate groups by their substantially higher stability to electrolytes and compatibility with pigments. Owing to the need for protection of the environment, a substitute for the process for producing PU latices using organic solvents is undoubtedly desirable if not essential. While maintaining the high quality of the dispersions normally obtained by a process in which organic solvents are used, the process according to the invention may dispense with the readily combustible organic solvents and thus substantially reduce the risk of explosion and fire. The process according to the invention has the further advantage of considerably increasing the volume/time yields compared with those obtained in the known solvent process since there are no volumes of solvent to be dealt with and no energy and time consuming distillation processes required.

The polyurethane(urea) dispersions prepared by the process according to the invention are suitable for various fields of application. For example, they may be used for dressing leather or for coating various materials and particularly also for coating textiles. For this purpose, they may be used as bonding or top coats. They may also be used for textile foam coating. Their use as adhesives or lacquers also constitute important fields of application.

The invention is further illustrated, but is not intended to be limited by the following examples in which all parts and percentages are by weight unless otherwise specified.

EXAMPLE 1

Reaction mixture 335.5 g of a polyester of adipic acid, hexanediol and neopentylglycol (molecular weight 1678) (PE),
12.8 g of the sodium salt of propoxylated 3-hydroxy-2-hydroxymethyl-propane-sulphonic acid-1 (molecular weight: 428) (AD),
69.6 g of hexamethylene-1,6-diisocyanate,
700 g of deionized water, and
33.8 g of the sodium salt of ethylene diamino-2-ethanesulphonic acid acid (45% in water) (AAS solution)

Method

A mixture of the sodium salt (AD) and hexamethylene-1,6-diisocyanate which has previously been stirred for about 5 minutes is added at 70° C to the ester (PE) which has been dehydrated in a vacuum at 120° C. The reaction mixture is stirred at 90° C until the NCO value is 2.1% and the water and AAS solution are then added one after another with stirring.

A dispersion which has a solids content of 35% and a viscosity measured in a Ford cup (4 mm nozzle) of 12 seconds is obtained. The dispersion shows the Tyndall effect in transmitted light.

The dispersion is suitable for textile coating. It dries to clear, transparent, elastic films which are distinguished by exceptionally high resistance to UV irradiation. The reduction is tensile strength at the end of a 400 hour test is only 60%.

EXAMPLE 2

Reaction mixture 335.4 g of polyester of adipic acid, hexanediol and neopentylglycol (molecular weight: 1678) (PE),
71.9 g of hexamethylene-1,6-diisocyanate,
16 g of the sodium salt of propoxylated 3-hydroxy-2-hydroxymethyl-propane-sulphonic acid-1 (molecular weight 428) (AD).
700 g of deionized water and
56.6 g of the sodium salt of ethylenediamino-2-ethanesulphonic acid (45% in water) (AAS solution)

Method

Hexamethylene-1,6-diisocyanate is added at 70° C to the ester (PE) which has been dehydrated in a vacuum at 120° C, and the sulphonate diol (AD) is added about 5 minutes later at 80° C. The reaction mixture is stirred at 90° C until the NCO value is 3.5%. The mixture of deionized water and AAS solution is then added with stirring.

A dispersion with a solids content of 38% and a Ford cup viscosity (4mm nozzle) of 12.4 seconds is obtained. The dispersion shows a Tyndall effect in transmitted light.

The dispersion is suitable for textile coating. It dries to a clear, translucent elastic film which has excellent resistance to UV irradiation (4% loss of tensile strength in the 400 hour test) and it loses only 10% of its initial tensile strength after a 14 day hydrolysis test. Tensile strength: 115 kp/cm$^2$ Elongation at break: 1190%

COMPARISON EXAMPLE

Reaction mixture 212 g of a polyester of adipic acid, hexanediol and neopentylglycol (molecular weight: 1696) (PE),
37.8 g of hexamethylene-1,6-diisocyanate,
40.1 g of the sodium salt of ethylenediamino-2-ethanesulphonic acid (45% in water) (AAS solution), and
600 g of deionized water.

Method

Hexamethylene-1,6-diisocyanate is added at 80° C to the ester (PE) which has been dehydrated in a vacuum at 120° C. The reaction mixture is stirred at 110° C until the NCO value is 3.3%. The mixture of water and AAS solution is then stirred in. A coarse dispersion with a solids content of 39.4% is obtained which sediments within a few minutes to form a mass which cannot be redispersed.

EXAMPLE 3

Reaction mixture 428.6 g of a polyester of adipic acid and butane-1,4-diol (molecular weight: 2143) (AB),
15.2 g of a propoxylated adduct of 2-butene-1,4-diol and NaHSO₃ (molecular weight 304) (AD),
87.5 g of 4,4'-diphenylmethanediisocyanate (44),
800 g of deionized water and
42.2 g of the sodium salt of ethylenediamino-2-ethanesulphonic acid (45% in water) (AAS solution).

Method

The adduct (AD) is added at 80° C to the ester (AB) which has been dehydrated in a vacuum at 120° C, and the diisocyanate (44) is then added also at 80° C. The reaction mixture is stirred at 80° C until the NCO value is 1.6. The deionized water is then added, followed by the AAS solution. Stirring is then continued for about 2 hours. The dispersion obtained has a solids content of 38%. Its viscosity is about 8000 cP. It may be used as adhesive. It has a peel strength of 2.2 kp/cm measured on soft PVC. It dries to a translucent, clear elastic film.

EXAMPLE 4

Reaction mixture 428.6 g of a polyester of adipic acid and butanediol (molecular weight 2143) (AB),
18 g of the sodium salt of propoxylated 3-hydroxy-2-hydroxymethyl-propane-sulphonic acid-1 (molecular weight 428) (AD),
73.2 g of hexamethylene-1,6-diisocyanate,
800 g of deionized water and
67.6 g of the sodium salt of ethylenediamino-2-ethanesulphonic acid (45% in water) (AAS solution).

Method: see Example 3

The resulting dispersion has a solids content of 36.4%. Its Ford cup viscosity (4mm nozzle) is 15 seconds. It is suitable for use adhesive. It has a peel strength of 3.5 kp/cm determined on soft PVC. It dries to a translucent, clear elastic film.

EXAMPLE 5

Reaction mixture 204.3 g of a polyester of adipic acid, hexanediol and neopentylglycol (molecular weight 1634) (PE),
83.2 f of hexamethylene-1,6-diisocyanate,
61.8 g of a propoxylated adduct of 2-butene-1,4-diol and NaHSO₃ (molecular weight 412) (AD),
650 g deionized water,
11.55 g of ethylene diamine (ADA) and
30 g of deionized water

Method

The hexamethylene-(1,6) diisocyanate is added at 70° C to the ester (PE) which has been dehydrated in a vacuum at 120° C. The mixture is left to react for 10 minutes and then slowly heated at 80° C. It is found to have an NCO value of about 11%. The adduct (AD) is then added and the mixture is stirred until the NCO value is about 5.1%. Water at a temperature of 80° C is stirred in. A mixture of ADA and 30 g of water is added after about 5 minutes. Stirring is then continued for about 1 hour.

A dispersion with a solids content of 33.3% and a viscosity of 2600 cP is obtained. It dries at about 140° C to transparent, clear elastic films. It is suitable for textile coating.

EXAMPLE 6

Reaction mixture 978 g of a polyester of phthalic acid, adipic acid and ethylene glycol (molecular weight 1686) (PAA),
94.3 g of propoxylated adduct of 2-butene-1,4-diol and NaHSO₃ (molecular weight 400) (AD),
197 g of hexamethylene-1,6-diisocyanate,
66.2 g of urea and
2650 g of deionized water.

Method

The ester (PAA) is dehydrated in a vacuum at 120° C for 30 minutes and then cooled to 90° C. The adduct (AD) is added. Hexamethylene-1,6-diisocyanate is then added at 60° C. The reaction mixture is stirred at a maximum temperature of 100° C for 95 minutes and then heated to 120° C. Urea is added and the mixture is left to react for 1 hour at 125° C. It is then cooled to 100° C and water heated to 80° C is stirred in. The mixture is then stirred for about 1 – 2 hours without heating.

The dispersion has a solids content of 32.8% and a Ford cup viscosity (4 mm nozzle) of 12 seconds.

The dispersion is suitable for use as emulsifier and as polymerization starter for emulsion polymers according to DOS No. 1,953,349. It may subsequently be chain lengthened with formaldehyde (donors) according to U.S. PS No. 3,756,992 and may be used as primer for dressing leather, for example.

EXAMPLE 7

Reaction mixture 369.2 g of a polyester of phthalic acid, adipic acid and ethylene glycol (molecular weight 1686) (PAA),
80.14 g of hexamethylene-1,6-diisocyanate,
19.4 g of an adduct of 2-butene-1,4-diol and Li-HSO₃ (molecular weight 176) (AD),
18.7 of urea,
1000 g of deionized water and
70 g of formaldehyde (30% in water).

Method

The ester (PAA) is dehydrated in a vacuum at 120° C for 30 minutes and then cooled to 60° C. The diisocyanate is reacted with the ester for 10 minutes, during which time the temperature is slowly raised to 80° C. The adduct (AD) is stirred in at 80° C and the mixture is heated to 115° C. When the NCO value reaches 2.65%, the temperature is raised to 130° C and urea is added. No more free NCO is left after about one hour. The deionized water (80° C) is added to 100° C. Finally, the formaldehyde is added. The mixture is then stirred for about 1 hour, during which time the temperature slowly drops to room temperature.

The dispersion has a solids content of 31.2% and a Ford cup viscosity (4 mm nozzle) of 18 seconds.

It is suitable for use as primer for dressing leather. It dries to transparent, clear elastic films.

EXAMPLE 8

Reaction mixture 369.2 g of a polyester of phthalic acid, adipic acid and ethylene glycol (molecular weight 1686) (PAA),
82.1 g of hexamethylene-1,6-diisocyanate,
22.88 g of the lithium salt of 3,4-dihydroxy-butane-sulphonic acid (AD) (molecular weight 176),
17.6 g of urea,
1000 g of deionized water and
70 g of formaldehyde (30% in water)

Method: See Example 7

The dispersion has a solids content of 31.3% and a Ford cup viscosity (4 mm nozzle) of 17 seconds.

Instead of 22.8 g of the adduct (AD), 24.3 g of the analogous ammonium salt which has a molecular weight of 187 may be used. A dispersion with a solids content of 31.5% and a Ford cup viscosity (4 mm nozzle) of 17 seconds is obtained.

Both dispersions are suitable for use as primers for dressing leather. Both show a Tyndall effect in transmitted light. They dry to clear, elastic films.

EXAMPLE 9

Reaction mixture:

326.8 g of a polyester of adipic acid, hexanediol and neopentyl glycol (molecular weight: 1634) (PE),
71.8 g of hexamethylene-1,6-diisocyanate,
6.99 g of an adduct of 2-butene-1,4-diol and $NH_4HSO_3$ (molecular weight: 187) (AD),
650 g of deionized water and
54.9 g of the sodium salt of ethylenediamino-2-ethanesulphonic acid (45% in water) (AAS solution).

Method: see Example 2

A finely-divided, non-sedimenting dispersion with a solids content of 32.55% and a Ford cup viscosity (4 mm nozzle) of 13.3 seconds is obtained.

The dispersion dries to clear, translucent elastic films. It is suitable for textile coating.

EXAMPLE 10

Reaction mixture:

326.8 g of a polyester of adipic acid, hexanediol and neopentyl glycol (molecular weight: 1634) (PE),
71.8 g of hexamethylene-1,6-diisocyanate,
11.52 g of a propoxylated adduct of 1-butene-3,4-diol and $NaHSO_3$ (molecular weight: 308) (AD),
650 g of deionized water and
55 g of the sodium salt of ethylenediamino-2-ethanesulphonic acid (45% in water) (ASS solution).

Method: see Example 2

A finely-divided dispersion with a solids content of 35.8% and a Ford cup viscosity (4 mm nozzle) of 14 seconds is obtained.

The dispersion dries to clear, translucent elastic films. It is suitable for textile coating. Tensile strength: 35 kp/cm³ Elongation at break: 810%

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing water soluble polyurethanes comprising
    a. forming a prepolymer in the absence of solvent at temperatures between about 30° and 120° C and an NCO to OH ratio of between about 1.05 and 6 by reacting
        i. sulphonate containing diols having a melting point or softening point below 120° C of the general formula

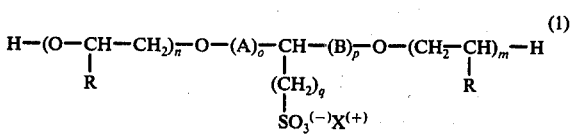

wherein
A and B, which may be the same or different, each represents a divalent aliphatic hydrocarbon group containing from 1 to 6 carbon atoms,
R represents hydrogen, an aliphatic hydrocarbon group containing 1 to 4 carbon atoms or a phenyl group,
$X^{(+)}$ represents an alkali metal cation or when $n + m > 0$ or when $q \neq 1$ an ammonium group which may be substituted.
$n$ and $m$, which may be the same or different, each represents an integer between 0 and 30 inclusive
$o$ and $p$ represent 0 or 1, and
$q$ represents an integer of from 0 to 2 with,
        ii. polyisocyanates of the formula
        (2) $Q(NCO)_2$ wherein
Q represents $C_4$ to $C_{12}$ alkyl, $C_6$ to $C_{15}$ cycloalkyl, $C_6$ to $C_{15}$ aryl or $C_7$ to $C_{15}$ aralkyl, and
        iii. dihydroxy compounds having molecular weights of about 1000 to 6000 selected from the group consisting of polyesters, polyethers, polythioethers, polyacetals, polycarbonates or polyester amides, and
    b. chain extending the prepolymer with water and water soluble diamines having molecular weights of about 32 to 600 and exclusively primary or secondary amino groups the proportion of reactants being so selected that the final polymer has a sulphonate group content of about 0.1 to 6 wt. %.

2. A solvent free process for the preparation of aqueous polyurethane dispersions which comprises
    a. the solvent free preparation of an NCO terminated prepolymer by the reaction of
        i. polyisocyanates,
        ii. diols which contain sulphonate groups and have melting or softening points below 120° C of the general formula

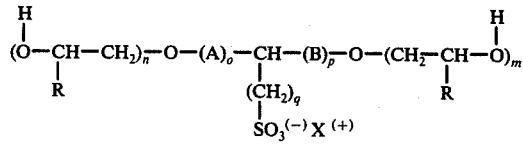

wherein
A and B, which may be the same or different, each represents a divalent aliphatic hydrocarbon group containing from 1 to 6 carbon atoms;

R represents hydrogen, an aliphatic hydrocarbon group containing from 1 to 4 carbon atoms or a phenyl group;

$X^{(+)}$ represents an alkali metal cation $n$ and $m$, which may be the same or different, each represents an integer between from 0 to 30;

$o$ and $p$ represent 0 or 1; and $q$ represents an integer of from 0 to 2 and iii. optionally other compounds which are at least difunctional per the purpose of the isocyanate polyaddition reaction and contain hydrogen atoms which are reactive with isocyanate groups, sufficient amounts of ii being used to provide the final polymer with 0.1 to 6 wt. % of $SO_3^{(-)}$ groups and b. the dispersion in water of said prepolymer by either
i. reacting the terminal isocyanate groups to form acylated amino end groups and then combining the prepolymer with water which may contain aqueous formaldehyde or formaldehyde donors, or
ii. combining said prepolymer directly with water which may contain water soluble chain lengthening agents or polyamines under such conditions as to effect chain extension of the prepolymer.

3. The process of claim 2, wherein
the optionally present reactive hydrogen bearing compounds carry the active hydrogen as hydroxyl groups,
b. the NCO to OH ratio of the prepolymer reactants is about 1.1 to 3,
c. the prepolymer formation is carried out in substance at temperatures between about 50 and 120° C,
d. the prepolymer is mixed with about 0.2 to 10 times its weight of water at temperatures of about 1 to 180° C, and
e. the prepolymer is chain lengthened with water and water soluble chain lengthening agents that are more reactive with isocyanate groups than water.

4. The process of claim 3, wherein
a. the optionally present reactive hydrogen bearing compounds are mainly diols with molecular weights between about 1000 and 6000 selected from the group consisting of hydroxypolyesters, hydroxypolyethers, hydroxypolythioethers, hydroxypolyacetals, hydroxypolycarbonates and hydroxypolyester amides,
b. the prepolymer is prepared at temperatures between about 50 and 120° C.,
c. the sulphonate diol is selected from those of the general formula (1) of claim 10, wherein R is methyl or hydrogen, $n$ and $m$ are limited to 0 to 3 and
i. A and B are methylene groups, $o$, $p$ and $q$ are all 1, or
ii. A is a methylene group, B is an ethylene group, $o$ and $p$ are both 1, and $q$ is 0, or
iii. B is a methylene group, $o$ is 0, $p$ is 1 and $q$ is 2;
d. the water soluble chain lengthening agent is a diamine with a molecular weight above 31 in which the amino groups are exclusively primary or secondary and
e. the final polymer has a sulphonate group content of about 0.6 to 3 wt. % based on the solid polymer.

5. The process of claim 4, wherein
a. $X^{(+)}$ is a lithium cation or a $NH_4^{(+)}$ ion,
b. $n$ and $m$ are 0, and
c. the chain lengthening agents include diamines modified by chemically fixed sulphonate groups.

6. A process for the solvent free preparation of aqueous polyurethane dispersions which comprises
a. the solvent free preparation of an NCO terminated prepolymer by the reaction of
i. polyisocyanates,
ii. diols which contain sulphonate groups and have melting points below 120° C of the formula

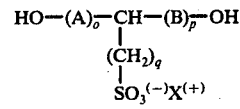

wherein
A and B which may be the same or different, each represents a divalent aliphatic hydrocarbon group containing from 1 to 6 carbon atoms;
$X^{(+)}$ an ammonium group which may be substituted;
$o$ and $p$ represent 0 or 1; and
$q$ represents an integer of from 0 to 2 and
iii. optionally other compounds which are at least difunctional for the purpose of the isocyanate polyaddition reaction and contain hydrogen atoms which are reactive with isocyanate groups, sufficient amounts of ii being used to provide the final polymer with 0.1 to 6 wt. % of $SO_3^{(-)}$ groups and
b. the combination of said prepolymer with water containing polyamines having chemically fixed ionic groups under such conditions as to effect chain extention of the prepolymer.

7. A solvent free process for the preparation of aqueous polyurethane dispersions which comprises
a. the solvent free preparation of an NCO terminated prepolymer by the reaction of
i. polyisocyanates,
ii. diols which contain sulphonate groups and have melting points below 120° C of the formula

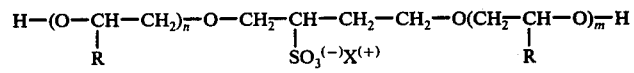

wherein
R represents hydrogen or a methyl group;
$n$ and $m$ which may be the same or different, each represents an integer of from 0 to 3; and
$X^{(+)}$ represents an alkali metal cation
iii. optionally other compounds which are at least difunctional for the purpose of the isocyanate polyaddition reaction and contain hydrogen atoms which are reactive with isocyanate groups, sufficient amounts of ii being used to provide the final polymer with 0.1 to 6 wt. % of $SO_3^{(+)}$ groups, and
b. the dispersion in water of said prepolymer by either
i. reacting the terminal isocyanate groups to form acylated amino end groups and then combining the prepolymer with water which may contain aqueous formaldehyde or formaldehyde donors, or ii. combining said prepolymer directly with water which may contain water soluble chain lengthening agents or polyamines under such conditions as to effect chain extension of the prepolymer.

8. A solvent free process for the preparation of aqueous polyurethane dispersions which comprises
   a. the solvent free preparation of an NCO terminated prepolymer by the reaction of
      i. polyisocyanates,
      ii. diols which contain sulphonate groups and have softening or melting points below 120° C of the formula

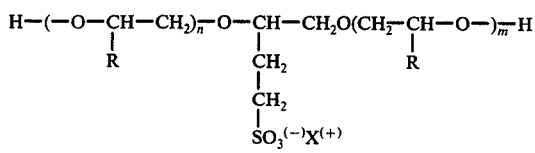

wherein
   R represents hydrogen or a methyl group;
   $n$ and $m$ which may be the same or different, each represents an integer of from 0 to 3; and
   $X^{(+)}$ represents an alkali metal cation
      iii. optionally other compounds which are at least difunctional for the purpose of isocyanate polyaddition reaction and contain hydrogen atoms which are reactive with isocyanate groups,
   sufficient amounts of ii being used to provide the final polymer with 0.1 to 6 wt. % of $SO_3^{(-)}$ groups, and
   b. the dispersion in water of said prepolymer by either
      i. reacting the terminal isocyanate groups to form acylated amino end groups and then combining the prepolymer with water which may contain aqueous formaldehyde or formaldehyde donors, or
      ii. combining said prepolymer directly with water which may contain water soluble chain lengthening agents or polyamines under such conditions as to effect the chain extension of the prepolymer.

9. A solvent free process for the preparation of aqueous polyurethane dispersions which comprises
   a. the solvent free preparation of a NCO terminated prepolymer by the reaction of:
      i. polyisocyanates,
      ii. diols which contain sulphonate groups and have melting points below 120° C of the general formula

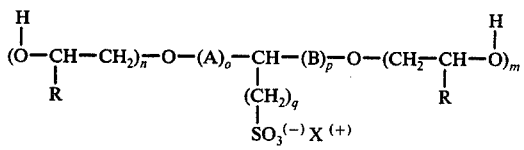

wherein
   A and B which may be the same or different, each represents a divalent aliphatic hydrocarbon group containing from 1 to 6 carbon atoms;
   R represents hydrogen, an aliphatic hydrocarbon group containing from 1 to 4 carbon atoms or a phenyl group,
   $X^{(+)}$ an ammonium group which may be substituted;
   $n$ and $m$ which may be the same or different, each represents an integer of from 0 to 30 and their sum is greater than 0,
   $o$ and $p$ represent 0 or 1; and
   $q$ represents an integer of from 0 to 2, and
      iii. optionally other compounds which are at least difunctional for the purpose of the isocyanate polyaddition reaction and contain hydrogen atoms which are reactive with isocyanate groups,
   sufficient amounts of ii being used to provide the final polymer with 0.1 to 6 wt. % of $SO_3^{(-)}$ groups, and
   b. combining said prepolymer directly with water and polyamines having chemically fixed ionic groups under such conditions as to effect chain extension of the prepolymer.

* * * * *